US008804649B1

(12) United States Patent
Guan et al.

(10) Patent No.: US 8,804,649 B1
(45) Date of Patent: Aug. 12, 2014

(54) SELF-OPTIMIZATION IN HETEROGENEOUS NETWORKS

(75) Inventors: Zaijin Guan, San Diego, CA (US); Hanson On, Escondido, CA (US); Yan Hui, San Diego, CA (US)

(73) Assignee: AirHop Communications, Inc., San Diego, CA (US)

( * ) Notice: Subject to any disclaimer, the term of this patent is extended or adjusted under 35 U.S.C. 154(b) by 100 days.

(21) Appl. No.: 13/547,637

(22) Filed: Jul. 12, 2012

Related U.S. Application Data

(60) Provisional application No. 61/507,891, filed on Jul. 14, 2011.

(51) Int. Cl.
| | |
|---|---|
| *H04W 4/00* | (2009.01) |
| *H04W 72/04* | (2009.01) |
| *H04W 16/24* | (2009.01) |
| *H04W 24/00* | (2009.01) |
| *H04W 16/02* | (2009.01) |
| *H04W 48/18* | (2009.01) |
| *H04W 52/40* | (2009.01) |
| *H04W 52/38* | (2009.01) |

(52) U.S. Cl.
CPC .............. *H04W 72/04* (2013.01); *H04W 16/24* (2013.01); *H04W 24/00* (2013.01); *H04W 16/02* (2013.01); *H04W 48/18* (2013.01); *H04W 52/40* (2013.01); *H04W 52/38* (2013.01)
USPC ........... 370/329; 370/252; 370/338; 370/278; 370/522; 455/446

(58) Field of Classification Search
CPC ...... H04W 72/04; H04W 16/24; H04W 24/00; H04W 16/02; H04W 84/18; H04W 52/24; H04W 52/40; H04W 52/38
See application file for complete search history.

(56) References Cited

U.S. PATENT DOCUMENTS

| | | | |
|---|---|---|---|
| 2009/0196193 A1* | 8/2009 | Frenger et al. ................ | 370/252 |
| 2010/0111021 A1* | 5/2010 | Hui ............................... | 370/329 |
| 2010/0216485 A1* | 8/2010 | Hoole ........................ | 455/452.2 |
| 2010/0238899 A1* | 9/2010 | Mansour et al. .............. | 370/331 |
| 2010/0317394 A1* | 12/2010 | Harris et al. .................. | 455/522 |
| 2011/0199985 A1* | 8/2011 | Cai et al. ...................... | 370/329 |
| 2011/0300871 A1* | 12/2011 | Dottling et al. .............. | 455/446 |
| 2012/0252440 A1* | 10/2012 | Watanabe ..................... | 455/423 |
| 2013/0310046 A1* | 11/2013 | Wegmann et al. ............ | 455/438 |

FOREIGN PATENT DOCUMENTS

WO    WO 2010060483 A1 * 6/2010

* cited by examiner

*Primary Examiner* — Kibrom T Hailu
(74) *Attorney, Agent, or Firm* — Van Pelt, Yi & James LLP

(57) ABSTRACT

Self-optimization in heterogeneous networks techniques are provided. In autonomous mode, certain self-optimization criteria are used to set up one or more targets with same or different priorities. The cells in a defined area of a HetNet autonomously adjust certain radio resources (e.g., power, time, frequency, and/or spatial resources (e.g. antenna, location)) in order to achieve or to be close to the targets such that the self-optimization criteria are met. In a coordinated mode, certain self-optimization criteria are used to define one or more cost functions with same or different priorities. The cells or a subset of users in the cells in a defined area of a HetNet search for the optimal solution for the cost functions by coordinating certain radio resources.

15 Claims, 16 Drawing Sheets if co-channel or adjacent channel neighbor detected then
　　Ec/Ior := best co-channel or adjacent channel Ec/Ior
　　RSCP := best co-channel or adjacent channel RSCP
　　if Ec/Ior for other cell > Ec/Ior$_{other\_cell}$ then
　　　　Calculate Pmax based on Ec/Ior$_{other\_cell}$
　　Calculate Ec/Ior for this cell UEs based on Pmax
　　if Ec/Ior for this cell <= Ec/Ior$_{cell\_UE}$ then
　　　　Calculate Pmax based on Ec/Ior$_{cell\_UE}$

FIG. 3

```
Divide the cell in to UEs being interfered and UEs not being interfered
for each UEs in the interfered group do
    find $(E_{c\_pdsch}/I_{or})_{target}$ based on required bit rate for each UE
    if the traffic channel power has been maximized
        find new total transmit power based on $(E_{c\_pilot}/I_{or})$ ue_report and $(E_{c\_pdsch}/I_{or})$ target
        Calculate $E_{c\_pilot}/I_{or}$ for other cell UEs based on the new transmit power
        if $(E_{c\_pilot}/I_{or})_{other\_cell} >= (E_{c\_pdsch}/I_{or})_{other\_cell\_target}$
            if new total transmit power <= maximum transmit power
                Use the new total transmit power
            else
                new total transmit power = maximum transmit power
            end
        else
            if new total transmit power <= maximum transmit power
                Use the new total transmit power
            else
                Using Fractional Time Re-use Algorithm
                    Set $P_{high}$= maximum transmit power with a predetermined period $T_{high}$
                        $P_{low}$= predetermined transmit power with a predetermined period $T_{low}$
            end
        end
    else if the traffic channel power has not been maximized
        find new total transmit power based on $(E_{c\_pilot}/I_{or})$ ue_report and $(E_{c\_pdsch}/I_{or})$ target
        Calculate $E_{c\_pilot}/I_{or}$ for other cell UEs based on the new transmit power
        if $(E_{c\_pilot}/I_{or})_{other\_cell} >= (E_{c\_pdsch}/I_{or})_{other\_cell\_target}$
            if new total transmit power <= maximum transmit power
                Use the new total transmit power
            else
                new total transmit power = maximum transmit power
            end
        else
            if new total transmit power <= maximum transmit power
                Use the new total transmit power
            else
                Using Fractional Time Re-use Algorithm
                    Set $P_{high}$= maximum transmit power with a predetermined period $T_{high}$
                        $P_{low}$= predetermined transmit power with a predetermined period $T_{low}$
            end
        end
end
```

FIG. 4

Add measurement report to the list of reports
Ec/Io$_{worst}$ := find the worst Ec/Io reported by the UE for the current cell or current group if Ec/Io$_{worst}$ >= Ec/Io$_{target}$
    Ec/Io$_{worst\_other\_cell}$ := find the worst Ec/Io reported for a neighbor cell;

if Ec/Io$_{worst\_other\_cell}$ < Ec/Io$_{other\_cell\_target}$
        Decrease the transmit power by one predetermined step
        if new total transmit power > minimum transmit power
            Apply new transmit power
        else
            Apply minimum transmit power
    else
        Increase the transmit power by one predetermined step
        if new total transmit power <= maximum transmit power
            Increase the transmit power by one predetermined step
        else
            Apply maximum transmit power
            Using Fractional Time Re-use Algorithm

FIG. 5

Add measurement report to the list of reports
Ec/Io$_{worst\_other\_cell}$ := find the worst Ec/Io reported for a neighbor cell;

if Ec/Io$_{worst\_other\_cell}$ < Ec/Io$_{other\_cell\_target}$
    Decrease the transmit power by one predetermined step
    if new total transmit power > minimum transmit power
        Apply new transmit power
    else
        Apply minimum transmit power
else
    Ec/Io$_{worst}$ := find the worst Ec/Io reported by the UE for the current cell or current group
    if Ec/Io$_{worst}$ < Ec/Io$_{target}$
        Increase the transmit power by one predetermined step
        Re-calculate Ec/Io$_{worst\_other\_cell}$ with the new transmit power
        if Ec/Io$_{worst\_other\_cell}$ < Ec/Io$_{other\_cell\_target}$
            Do not apply new transmit power
        else
            if new total transmit power <= maximum transmit power
                Apply new transmit power
            else
                Apply maximum transmit power
                Using Fractional Time Re-use Algorithm

FIG. 6

```
for each time interval T
  for each cell (start from the largest total transmit power) do
    increase the total transmit power for one neighbor cell by a predetermined amount,
    recaculate cost function Ui for each neighbor cell
    if
      ΣUi is larger than the previous ΣUi
        store the transmit power for all the cells
    end
  end
Apply the transmit power with the maximum cost function ΣUi
end
```

FIG. 9

```
for each time interval T
    for each cell (start from the largest total transmit power) do
        increase the total transmit power for one neighbor cell by a predetermined
        amount,
        recaculate $(E_{c\_pilot}/I_{or})$ and $(E_{c\_pdsch}/I_{or})$ for all the cells
        find correspondent max bit rate for all the cells
        calculate total throughput under the new transmit power for each cell
    end
    sort the total throughput and find transmit power with the maximum throughput
    apply the transmit power
end
```

FIG. 10

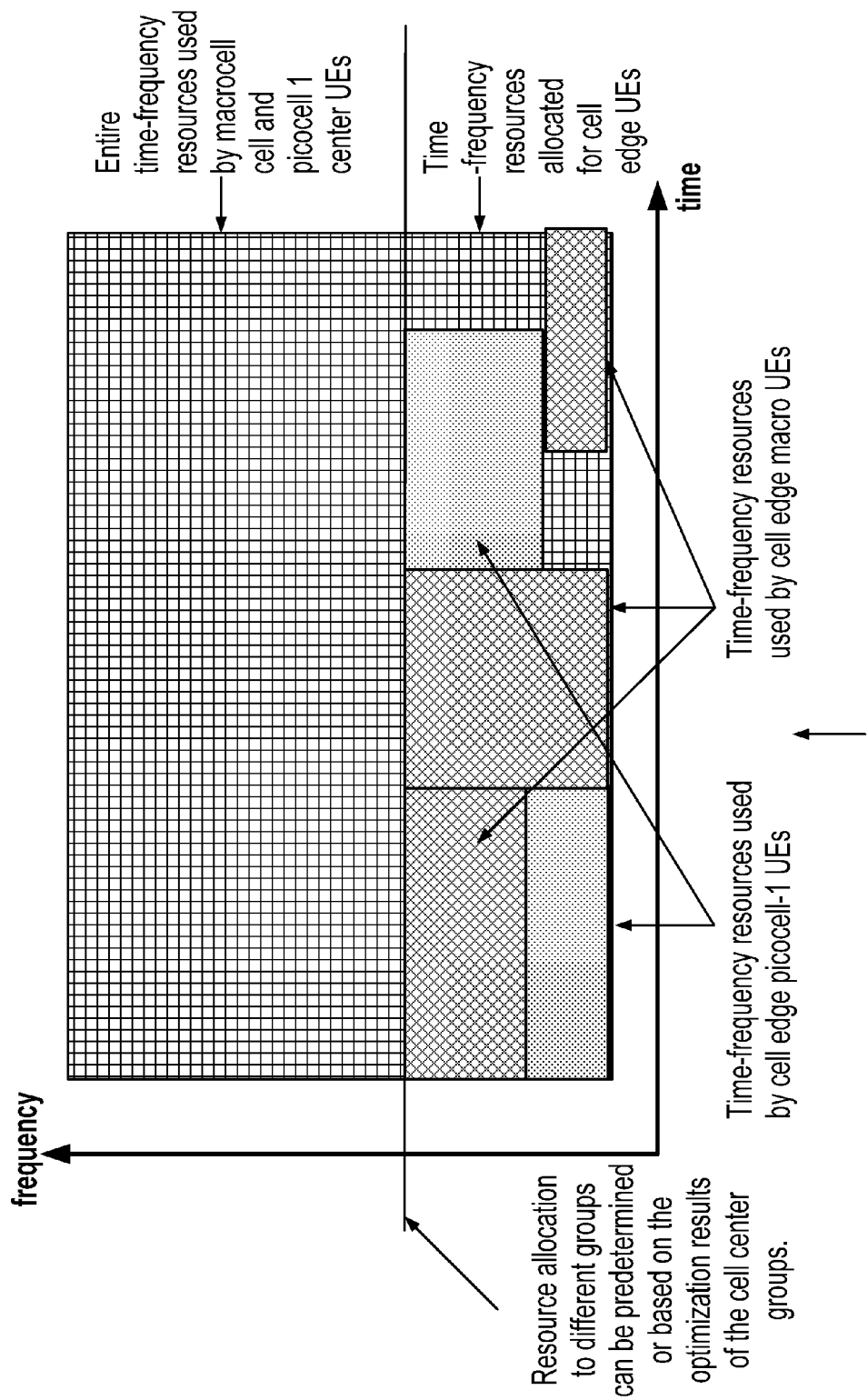

US 8,804,649 B1

SELF-OPTIMIZATION IN HETEROGENEOUS NETWORKS

CROSS REFERENCE TO OTHER APPLICATIONS

This application claims priority to U.S. Provisional Patent Application No. 61/507,891 entitled SELF-OPTIMIZATION IN HETEROGENEOUS NETWORKS filed Jul. 14, 2011 which is incorporated herein by reference for all purposes.

BACKGROUND OF THE INVENTION

The explosive adoption of video-enabled wireless mobile devices has triggered a significant increase in data traffic across wireless networks and exposed the capacity constraints of conventional wireless network topologies.

Conventional wireless network (e.g., cellular network) deployment requires careful planning to maximize frequency reuse, minimize coverage dead zones, and minimize inter-cell interference. Wireless network deployment is labor intensive due to a significant amount of measurements and field trials. To reduce the cost of deployment, many network operators deploy macro cells which provide larger coverage footprint and higher capacity. This approach can work when the subscribers' service types are mainly conversational (e.g., voice), interactive (e.g., web browsing and instant messaging), or low rate streaming. These are the typical service types for 2G (e.g., GSM) and early 3G (e.g., UMTS Release 99 and CDMA2000) cellular networks where macro cell can often provide adequate Quality of Service (QoS) to fulfill the majority of subscribers' needs.

More subscribers are demanding faster data service as the bit rate at the air interface increases with the advance of the wireless technology (e.g., 3.5G and 4G). One example of 4G networks is LTE (e.g., 3GPP Release 8 and beyond), another is WiMax (e.g., IEEE802.16e and beyond). Given the limited available spectrum, the capacity becomes a serious issue for conventional macro cell. The capacity issue has caused a shift in cellular network deployment paradigm from well partitioned large coverage macro cells to densely deployed smaller cells (e.g., picocell, remote radio head, and femtocell), many being added dynamically in non-fixed locations. A mix of such cells with a combination of different air interfaces is often termed as Heterogeneous Networks (HetNet).

Self-Organized Networks (SON) is a relatively new concept in wireless networks and are typically using self-configuration and self-healing with respect to macrocell networks. There exist critical shortcomings associated with the current realization of SON, such as an inability to realize SON between small cells and macrocells, an inability to manage interference, reuse spectrum, and various other shortcomings.

BRIEF DESCRIPTION OF THE DRAWINGS

Various embodiments of the invention are disclosed in the following detailed description and the accompanying drawings.

FIG. 3 illustrates an exemplary pseudo code for the initial transmit power set up based on the two criteria with different priorities in accordance with some embodiments.

FIG. 4 illustrates an exemplary pseudo code for dynamic transmit power adjustment based on the two criteria with different priorities in accordance with some embodiments.

FIG. 5 illustrates an exemplary pseudo code for dynamic transmit power adjustment based on the two criteria with different priorities in accordance with some embodiments.

FIG. 6 illustrates an exemplary pseudo code for dynamic transmit power adjustment based on the two criteria with different priorities than FIG. 5 in accordance with some embodiments.

FIG. 9 illustrates an exemplary pseudo code for dynamic transmit power coordination based on a generic cost function in accordance with some embodiments.

FIG. 10 illustrates an exemplary pseudo code for dynamic transmit power coordination with a data rate based cost function for 3G UMTS or CDMA in accordance with some embodiments.

FIG. 11A illustrates an example of how the radio resources are dynamically allocated in time-frequency plane of an OFDM system with different cost functions for different UE groups in accordance with some embodiments.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

After reading this description, it will become apparent to one skilled in the art how to implement the invention in various alternative embodiments and alternative applications. Although various embodiments of the present invention are described herein, it is understood that these embodiments are presented by way of example only, and not limitation. As such, this detailed description of various alternative embodiments should not be construed to limit the scope or breadth of the present invention.

Self-optimization in heterogeneous networks techniques are provided. Self-optimization in heterogeneous networks techniques described herein relate to wireless communications, and specifically, methodology, algorithm and implementation for self-optimization of heterogeneous networks that can include, for example, Macrocells, Picocells, Femtocells, Remote Radio Heads (RRHs), Access Points (APs), and in one or more layers, are described herein.

Figure 1A:
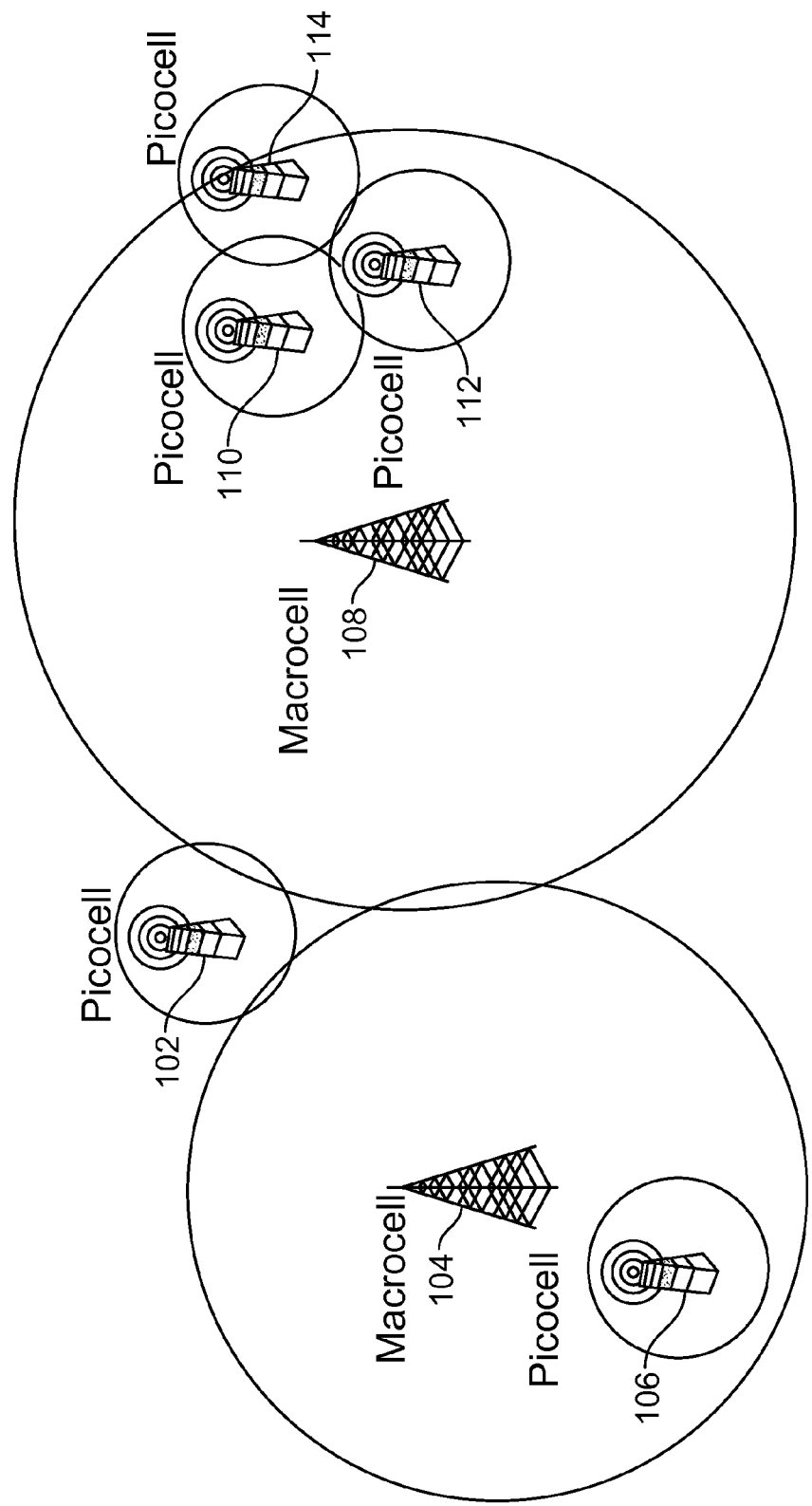
FIG. 1A illustrates a simplified example of a heterogeneous network (HetNet) with different type of cells.

FIG. 1A illustrates a simplified example of a heterogeneous network (HetNet) with different type of cells. As shown, FIG. 1A illustrates a HetNet including a Picocell 102 that has a coverage area that overlaps with the coverage areas of a Macrocell 104 and a Macrocell 108 (e.g., each of the Macrocells 104 and 108 also have overlapping coverage areas with each other). As also shown, a Picocell 106 is within the coverage area of the Macrocell 104, and Picocells 110, 112, and 114 are within and/or have overlapping coverage areas with Macrocell 108 (e.g., each of the Picocells 110, 112, and 114 also have overlapping coverage areas with each other). In some embodiments, HetNet optimization is addressed as a multi-cell and/or multi-layer self-organizing and self-optimizing problem. For example, in autonomous mode, certain self-optimization criteria can be used to set up one or more targets with the same or different priorities. The cells in a defined area of a HetNet can autonomously adjust certain radio resource, such as power, time, frequency, and/or spatial resources (e.g., antenna, location), in order to achieve or to be close to the targets such that the self-optimization criteria are met. As another example, in a coordinated mode, certain self-optimization criteria can be used to define one or more cost functions with the same or different priorities. The cells or a subset of users in the cells in a defined area of a HetNet search for the optimal solution for the cost functions by coordinating certain radio resources, such as power, time, frequency, and/or spatial resources (e.g., antenna, location).

In the 3GPP terminology, base stations (BTSs) are also referred to as NodeBs (e.g., for 3G UMTS) or eNodeBs (e.g., for LTE). The BTSs can also be categorized, such as by their footprints, capacity, transmit power, and/or other criteria, into Macrocell, and Small cells, such as Femtocells, Picocells, or Remote Radio Heads (RRHs).

In the following description, the neighboring cells refer to the scenario where cells are neighboring each other, as well as the scenario where cells are overlapping with each other in a multi-tier network, such as picocells or femtocells under a macrocell.

When the BTSs are using the same frequency for transmitting and receiving with relatively large transmitting power and when they are neighboring to each other, performance, such as system and user throughput or QoS can be degraded due to a number factors, such as the interference between the BTSs and among the users in the same BTS or in different BTSs in a two-tier scenario. Even if the BTSs use different frequencies for transmitting and receiving, adjacent channel interference can still exist.

In some embodiments, a target based multi-cell optimization is performed in an autonomous mode. Each cell autonomously adjusts certain radio resources, such as power, time, frequency, and/or spatial resources, in order to achieve or to be close to the targets such that the self-optimization criteria are met.

In some embodiments, more than one self-optimization criteria are used to set up targets in an autonomous mode of multi-cell optimization, in which the targets can have same or different priorities. Each cell autonomously adjust certain radio resources, such as power, time, frequency, and/or spatial resources, in order to achieve or to be close to the targets such that the self-optimization criteria are met based on these defined priorities.

In some embodiments, different targets or criteria can be applied to different cells, different groups of UEs, and/or different individual UEs. Grouping of UEs can be performed based on the optimization criteria. For example, if the objective is to manage the inter-cell interference, the grouping can be based on the location of the UEs. As another example, UEs in a cell can be grouped into one or more cell edge groups and one or more cell center groups. If the objective is to optimize QoS, the grouping can be based on the different service tiers that UEs belong to. An example of different UE grouping for different purposes of self-optimization is illustrated in FIG. 1B, as discussed below.

Figure 1B:
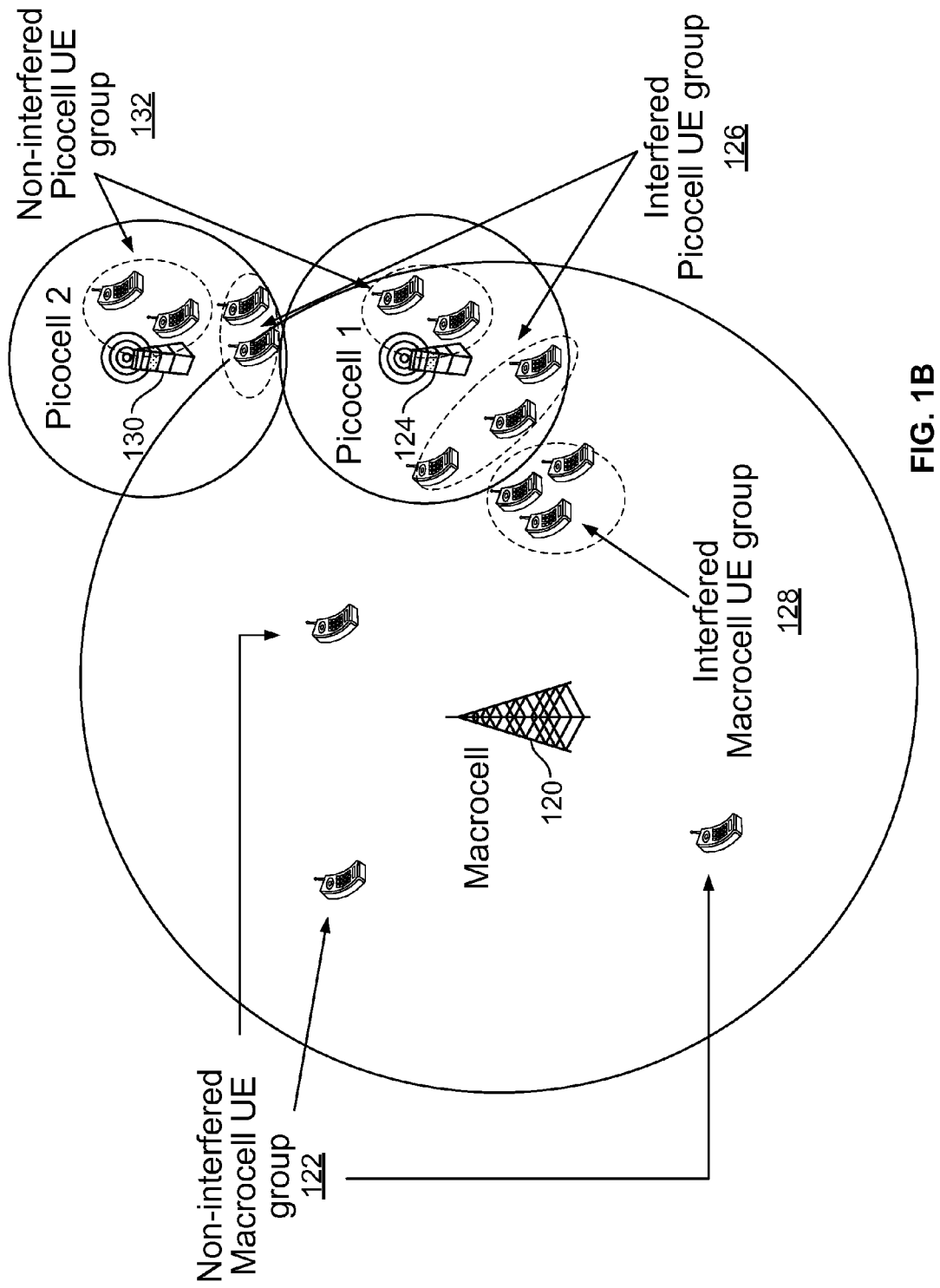
FIG. 1B illustrates an example of a grouping of User Equipment (UEs) for different purposes for self-optimization in a HetNet in accordance with some embodiments.

FIG. 1B illustrates an example of a grouping of User Equipment (UEs) for different purposes for self-optimization in a HetNet in accordance with some embodiments. As shown, FIG. 1B illustrates a HetNet including a Macrocell that has a coverage area that overlaps with the coverage areas of a Picocell 124 and a Picocell 130. As also shown, a non-interfered Macrocell UE group 122 is within the non-overlapped coverage area of Macrocell 120, whereas Interfered Macrocell UE group 128 is in an area of overlapping coverage area due to its proximity to the overlapping coverage area of Picocell 124. Non-interfered Picocell UE groups 132 are within the non-overlapped coverage areas of each of Picocell 124 and 130, respectively, whereas Interfered Picocell UE groups 126 are in an area of overlapping coverage area due to their proximity to the overlapping coverage areas of Picocells 124 and 130 and/or Macrocell 120 as shown.

In some embodiments, the target based optimization using autonomous mode can be used in BTS self-configuration in order to set up desired initial parameters, such as transmit power, fractional time reuse (FTR) parameters, fractional frequency reuse (FFR) parameters, antenna related parameters (e.g., tilting), and/or various other parameters. For example, this can be applied to both initial self-configuration or self-healing during the operation. The measurements that are used to in the calculation can either be determined from the sniffer receiver inside the NodeB and/or from UE reports.

One such example is a self-configuration of a 3G UMTS picocell NodeB. As described herein, one can use user data rate as a criteria to define the targets in terms of Signal-to-Noise (SNR) to support the required user data rate. When there is more than one target, it can be assigned with different priorities. Then radio resources, for example, transmit power, can be adjusted in order to achieve the targets.

Figure 2:
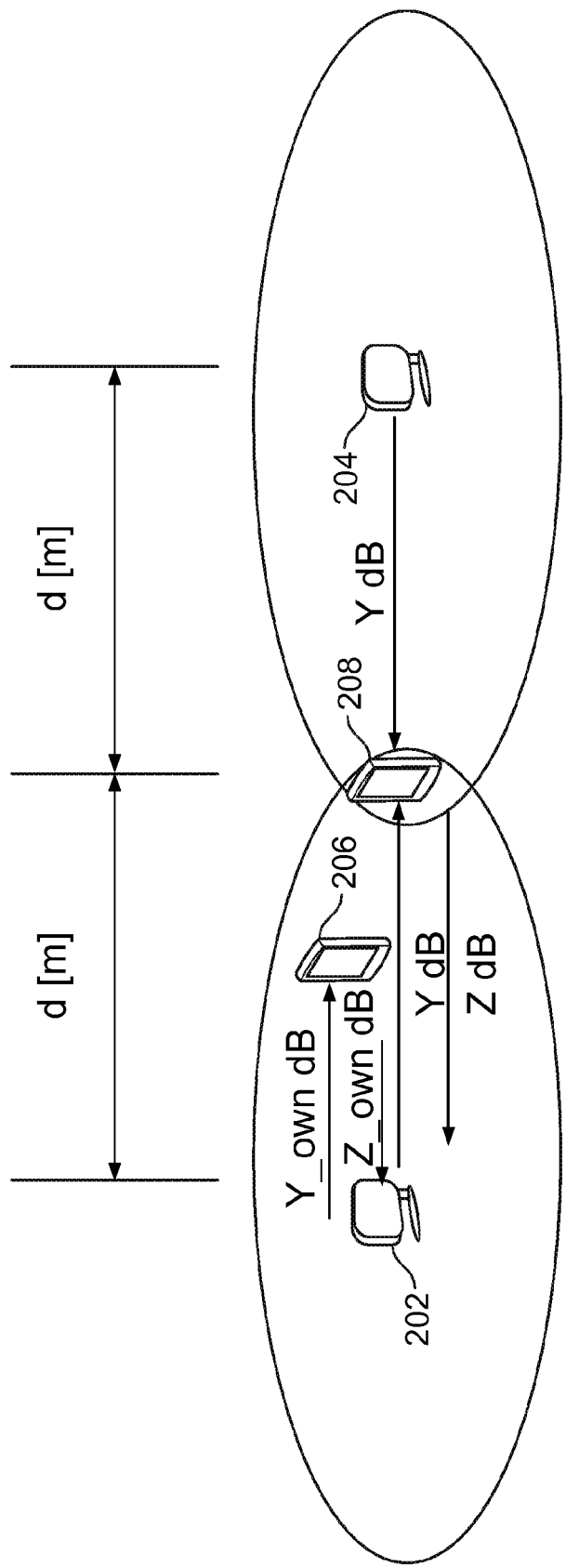
FIG. 2 illustrates an example inter-cell interference management using prioritized optimization criteria or targets in accordance with some embodiments.

FIG. 2 illustrates an example inter-cell interference management using prioritized optimization criteria or targets in accordance with some embodiments. As shown, UE 208 is in an overlapping coverage area between cells 202 and 204. As also shown, UE 206 is within the non-overlapped coverage area of cell 202. For example, for a given cell in a HetNet there can be two competing criteria when determining initial transmit power. The first criteria is used to make sure the User Equipment (UEs) from other neighboring picocells or macrocells can still achieve $$\frac{E_c}{I_{or}}$$

target, $$\frac{E_c}{I_{or\_other\_cell}},$$

even after this "new" cell starts transmitting. The second criteria is used to make sure the UEs in this cell can achieve their own required $$\frac{E_c}{I_{or}}$$

target, $$\frac{E_c}{I_{or\_cell\_UE}}.$$

For the first criteria, assume the target $$\left(\frac{E_c}{I_{or}}\right)_{target} = \frac{E_c}{I_{or\_other\_cell}},$$

CPICH RSCP and RSSI measured by the sniffer at the NodeB can bas used to calculate $$\frac{E_c}{I_{or}}$$

for the UEs for another cell, i.e.

$$\frac{E_c}{I_{or}} = RSCP - RSSI(\text{db}).$$

Assume the sniffer receiver has an antenna gain of $G_{cell\_ant}$ dB. The initial transmit power should be the following based on the first criteria:

$$P_{max} = Y + RSCP - G_{cell\_ant} + Z - P_{pilot} + 10\log_{10}\left(10^{\frac{-E_c/I_{or\_other\_cell}}{10}}\right) - 10^{\frac{-E_c/I_{or}}{10}}$$

where Y and Z are defined as in FIG. 2, $P_{pilot}$ is the total pilot power.

For the second criteria, assume the target $$\left(\frac{E_c}{I_{or}}\right)_{target} = \frac{E_c}{I_{or\_cell\_UE}}, P_{pilot} = -10 \text{ dB}$$

if pilot is 10% of the total transmit power, and $P_{pilot} = -7$ dB if the pilot is 20% of the total transmit power. The CPICH RSCP at its own UE which is $Y_{own}$ dB away is $P_{max} + P_{pilot} - Y_{own}$. The transmit power should be the following based on the second criteria:

$$P_{max} = RSCP - \frac{E_c}{I_{or}} + Z_{own} + P_{pilot} + \frac{E_c}{I_{or\_cell\_UE}} - 10\log_{10}\left(1 - 10^{\frac{E_c/I_{or\_cell\_UE}}{10}}\right).$$

To determine $P_{max}$ derived from the two targets, priority of the two criteria has to be determined and it depends on the use cases. For example, in a picocell or femtocell under a macrocell case, the first criteria could take higher priority than the second criteria for the smaller cells in order to minimize the impact on the existing macrocell networks by adding picocells; for macrocell on the other hand, the second criteria could take higher priority.

Another example could be a cluster of small cells (e.g., picocells or femtocells), where the second criteria takes higher priority than the first so that each small cell protects its own users first before accommodating other users. FIG. 3 illustrates an exemplary pseudo code for the initial transmit power set up based on the two criteria with different priorities in accordance with some embodiments. In particular, the exemplary pseudo code shown in FIG. 3 illustrates how the initial transmit power are set based on the two criteria above with the second criteria having a higher priority for that cell. In the example, 3G UMTS specific parameters, such as $$\frac{E_c}{I_{or}},$$

RSCP, RSSI, were used. In LTE equivalent parameters, such as RSRP and RSRQ, were defined. Therefore, even though the example is for 3G UMTS, it can be readily applied to LTE and other air interface with appropriate modification of the parameters.

The above-described techniques can also be extended to more than two criteria. Also, although the transit power is used here as the radio resource, other radio resources, such as time, frequency, and/or spatial, can also be adjusted with appropriate criteria.

In some embodiments, the target based optimization using autonomous mode can be used dynamically during the operation in order to adjust in real-time the parameters, such as transmit power, fractional time reuse (FTR) parameters, fractional frequency reuse (FFR) parameters, antenna related parameters (e.g., tilting), and so on. The measurements that are used in the calculation can either from the sniffer receiver inside the NodeB or from UE reports.

One such example is to autonomously self-optimize 3G UMTS picocell NodeBs during the operation. Referring to FIG. 2 as an example again but this time it is after the NodeBs have been properly self-configured. For each of the cells, the first criteria is to make sure the UEs from other picocells or macrocells achieve certain target, such as instantaneous peak rate, or total throughput, both of which can also be expressed by $$\left(\frac{E_{c\_pdsch}}{I_{or}}\right)_{other\_cell}$$

or $$\left(\frac{E_{c\_pilot}}{I_{or}}\right)_{other\_cell}.$$

The second criteria is to make sure the UEs in this cell can achieve certain target, such as instantaneous peak rate, or total throughput, both of which can also be expressed by $$\left(\frac{E_{c\_pdsch}}{I_{or}}\right)_{cell\_UE}$$

or $$\left(\frac{E_{c\_pilot}}{I_{or}}\right)_{cell\_UE}.$$

For HS-PDSCH, $$\frac{E_{c\_pdsch}}{I_{or}} = R_{pdsch\_pilot} + \frac{E_{c\_pilot}}{I_{or}} \text{ where } R_{pdsch\_pilot}$$

is the ratio of transmit power between the data traffic channel and pilot channel in dB. Therefore, for a required data rate, a correspondent $$\frac{E_{c\_pdsch}}{I_{or}}$$

can be derived based on different channel condition and traffic model. Initial $R_{pdsch\_pilot}$ is normally known from the configuration. For example, if 20% power is allocated to pilot and 10% is allocated to the overhead control channel, the remaining 70% is allocated to the data traffic channel. In that case, $R_{pdsch\_pilot}$=8.5 dB.

$$\frac{E_{c\_pilot}}{I_{or}}$$

can be measured periodically either by base station sniffer or ideally, by individual UEs. Assuming the transmit power from neighbor cells do not change during the transmit power adjustment period of this cell, when the total transmit power in this cell is increased by $\Delta P_{total}$, a new $$\frac{E_{c\_pilot}}{I_{or}}$$

can be calculated based on the UE reported old $$\frac{E_{c\_pilot}}{I_{or}}$$

and power increase as follows:

$$\left(\frac{E_{c\_pilot}}{I_{or}}\right)_{new} =$$

$$P_{total} + \Delta P_{total} + P_{pilot} - 10\log_{10}\left(10^{\frac{\Delta P_{total}}{10}} + 10^{\frac{P_{total} + P_{pilot} - \left(\frac{E_{c\_pilot}}{I_{or}}\right)_{old}}{10}}\right).$$

If the total traffic power has reached its maximum, $$\left(\frac{E_{c\_pdsch}}{I_{or}}\right)_{new} = R_{pdsch\_pilot} + \left(\frac{E_{c\_pilot}}{I_{or}}\right)_{new}.$$

This can be used to calculate the date rata (or throughput) that can be achieved. In the case that $R_{pdsch\_pilot}$ is not at its maximum, e.g., less than full traffic power is being transmitted, the same method can be used to calculate $$\left(\frac{E_{c\_pdsch}}{I_{or}}\right)_{new}.$$

However, $R_{pdsch\_pilot}$ need to be recalculated based on the new total transmit power $$P_{total} + \Delta P_{total} \text{ by } R_{pdsch\_pilot} =$$

$$10\log_{10}\left(10^{\frac{-(P_{total} + \Delta P_{total})}{10}} * \left(1 - \frac{10^{\frac{-P_{pilot}}{10}}}{P_{max} * 10^{\frac{-P_{pilot}}{10}}}\right)\right).$$

One then can use the same method as above to calculate the required $$\left(\frac{E_{c\_pdsch}}{I_{or}}\right)_{new}$$

which can then be used to calculate the date rata (or throughput) that can be achieved.

How to use different priorities to multiple criteria (e.g., two in this case) depends on the use cases. For example, in a picocell/macrocell case, for picocell, the first criteria would take higher priority than the second criteria in order to minimize the impact of adding a picocell; for macrocell in this case, the second criteria will take higher priority. For a cluster of picocells or femtocells, it is possible that the second criteria takes higher priority than the first criteria.

Different criteria can not only be assigned to the entire cell but also can be applied to different groups. For example, the users inside a cell can be divided into cell edge group and cell center group based on certain location information. As another example, the users inside a cell can be divided into the group that are interfered by the neighbor cells and the group that are not interfered by the neighbor cells based on certain interference measurement by users and a threshold. Different criteria can then be applied to these two different groups.

FIG. 4 illustrates an exemplary pseudo code for dynamic transmit power adjustment based on the two criteria with different priorities in accordance with some embodiments.

FIG. 5 illustrates an exemplary pseudo code for dynamic transmit power adjustment based on the two criteria with different priorities in accordance with some embodiments.

In particular, the exemplary pseudo code provided in FIG. 4 and FIG. 5 illustrate how the transmit power are dynamically adjusted based on the two criteria above with the second criteria, that is for the users for its own cell, has higher priority for that cell. In this example, 3G UMTS specific parameters, such as $$\frac{E_c}{I_{or}},$$

RSCP, RSSI, were used. In LTE equivalent parameters, such as RSRP and RSRQ etc., were defined. Therefore, even though the example is for 3G UMTS, it can be readily applied to LTE and other air interface with appropriate modification of the parameters.

FIG. 6 illustrates an exemplary pseudo code for dynamic transmit power adjustment based on the two criteria with different priorities than FIG. 5 in accordance with some embodiments. In particular, the exemplary pseudo code provided in FIG. 6 illustrate how the transmit power are dynamically adjusted based on the two criteria above but with opposite priority than FIG. 4 and FIG. 5. It should be noted that even though the power is used here as the radio resource, other radio resources, such as time, frequency, and/or spatial, can also be adjusted with appropriate criteria.

In some embodiments, multi-cell optimization is performed in a coordinated mode. For each neighboring cell, certain self-optimization criteria are used to define one or more cost functions with same or different priorities. The neighboring cells coordinately search for the optimal solution using the cost functions based on certain radio resources, such as power, time, frequency, and/or spatial, while taking into account of Quality of Services (QoS) of the neighboring cells.

The above multi-cell optimization problem is to allocation of radio resources to optimize (e.g., maximize or minimize):

$$\sum_{i \in G} U_i(r_i)$$

where $U_i(\cdot)$ is the cost functions. In a data rate based cost function, $r_i$ can be instantaneous data rate or averaged data rate. G is a set that includes a group of cells or groups of UEs in multiple cells.

Figure 7A:
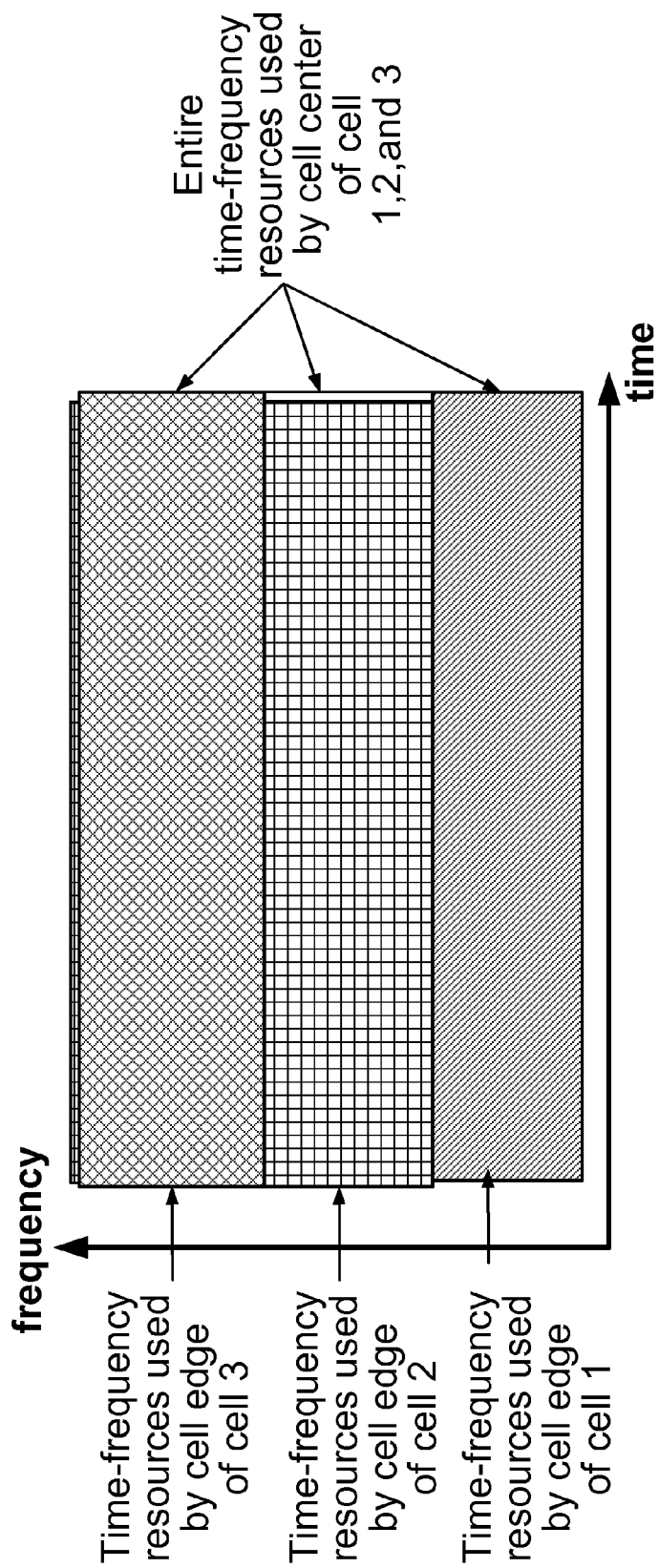
FIG. 7A illustrates an example of conventional Fractional Frequency Reuse (FFR) by reusing frequency for the cell center and cell edge in an OFDM system in accordance with some embodiments.

FIG. 7A illustrates an example of conventional Fractional Frequency Reuse (FFR) by reusing frequency for the cell center and cell edge in an OFDM system in accordance with some embodiments.

Figure 7B:
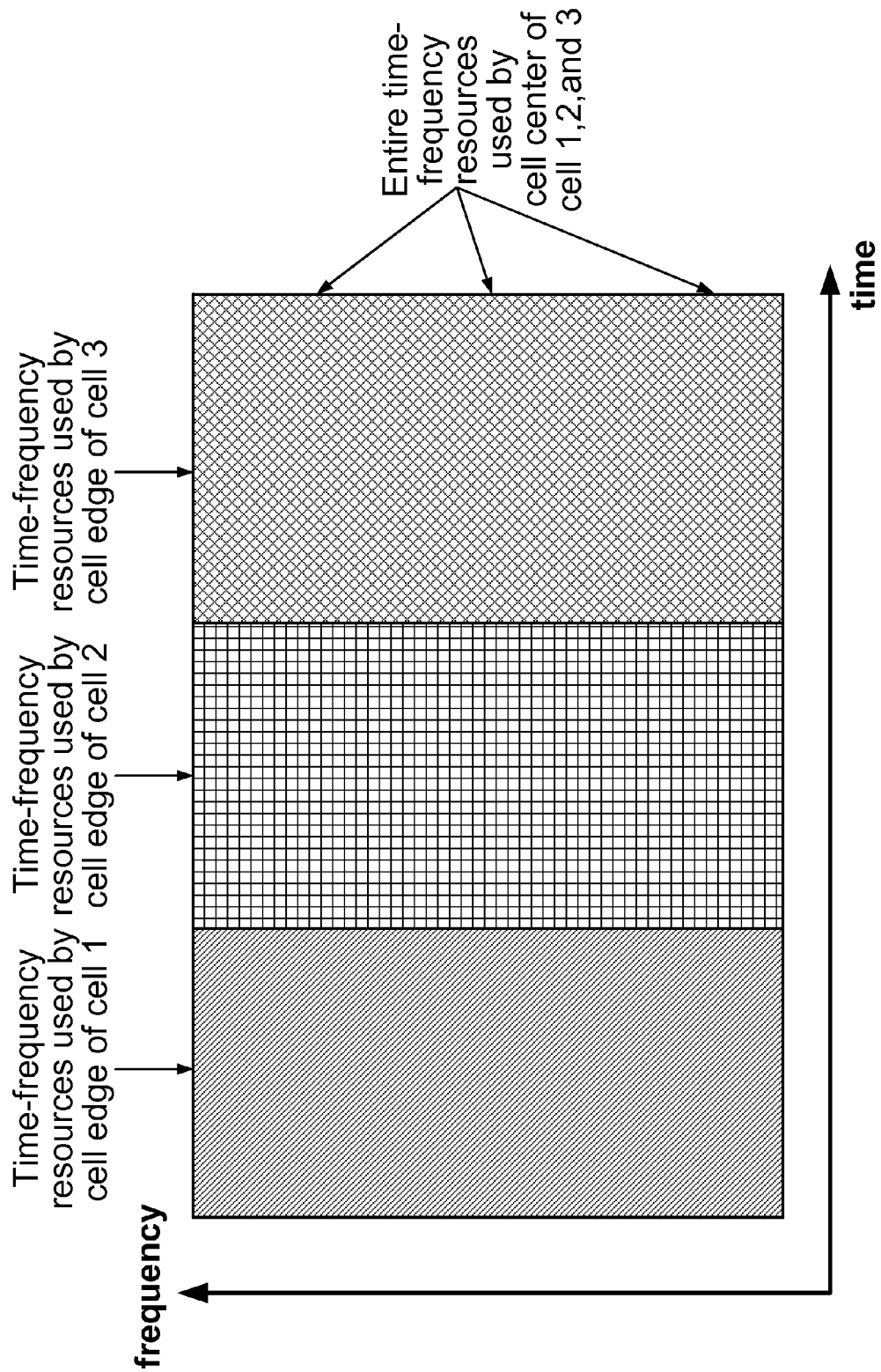
FIG. 7B illustrates an example of conventional Fractional Time Reuse (FTR) by reusing time for the cell center and cell edge in an OFDM system in accordance with some embodiments.

FIG. 7B illustrates an example of conventional Fractional Time Reuse (FTR) by reusing time for the cell center and cell edge in an OFDM system in accordance with some embodiments.

FIG. 9 illustrates an exemplary pseudo code for dynamic transmit power coordination based on a generic cost function in accordance with some embodiments. In particular, FIG. 9 illustrates an example to coordinately determine the transmit power for neighbor cells in order to optimize a cost function $U_i(\cdot)$. In this example, all the cells have the same cost function and same priority. As an example, the cost function can be cell throughput and the optimization procedure will find the transmit power for the neighbor cells that maximize the overall multi-cell throughput.

FIG. 10 illustrates an exemplary pseudo code for dynamic transmit power coordination with a data rate based cost function for 3G UMTS or CDMA in accordance with some embodiments.

The cost function can also be throughput not for the entire cells but for a group of UEs in each cell. For example, by maximizing the cell edge group overall throughput over multiple neighbor cells, it actually minimizes the interference based on the cost function of cell edge group throughput. As another example, the cost function can also be a peak data rate of a group of UEs at the cell edge in each cell. By maximizing the cell edge group peak data rate over multiple neighbor cells, it actually maximizes the QoS in terms of instantaneous peak rate for the cell edge UEs.

Even though the example is applied to an optimization with respect to transmit power, it can similarly be applied for other radio resources, such as such as time, frequency, spatial, and/or other radio resources.

In some embodiments, the radio resources can be dynamically reused by different UE groups based on the multi-cell optimization described above, as further discussed below with respect to FIGS. 8A-8C.

Figure 8A:
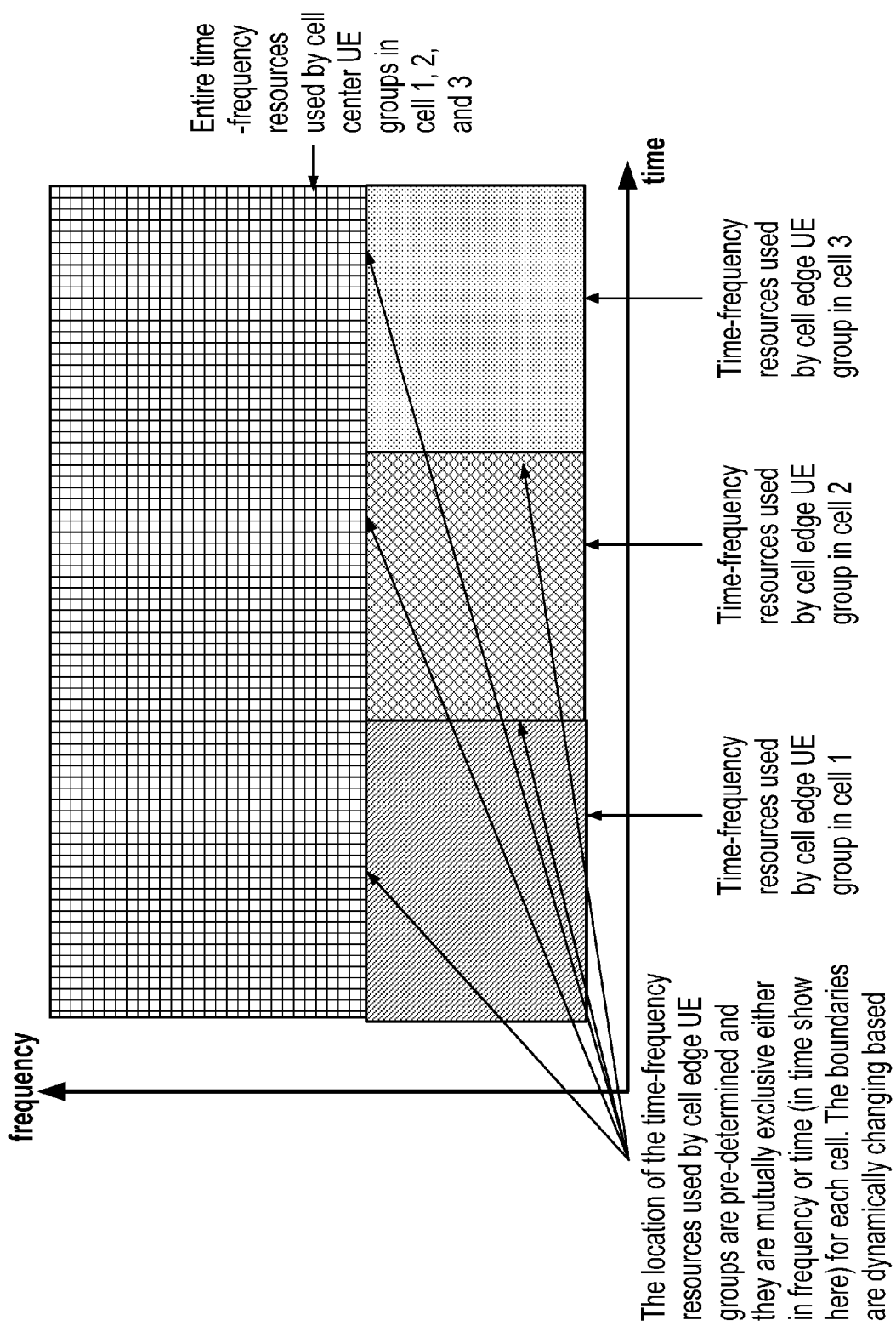
FIG. 8A illustrates an example of dynamic Fractional Time-Frequency Reuse (FTFR) by reuse time and frequency for the cell center and cell edge UE groups in an OFDM system in accordance with some embodiments.

FIG. 8A illustrates an example of dynamic Fractional Time-Frequency Reuse (FTFR) by reuse time and frequency for the cell center and cell edge UE groups in an OFDM system in accordance with some embodiments. In this example, the location of radio resources for the cell edge groups are pre-determined, and they are mutually exclusively for cell edge UE groups of neighboring cells. However, the boundaries (e.g., the amount of resources allocated to each cell) are dynamically changing based on the multi-cell optimization results.

Figure 8B:
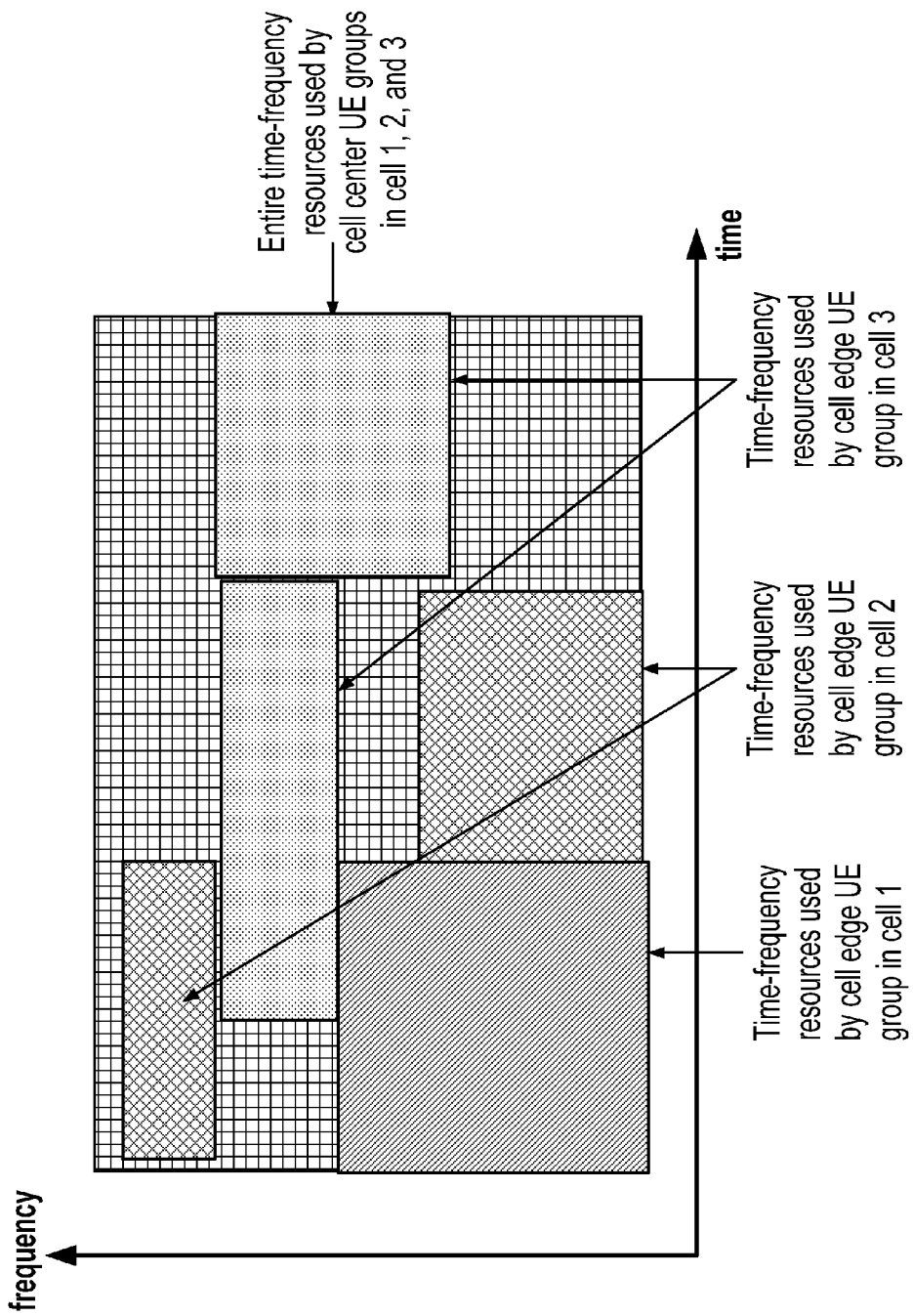
FIG. 8B illustrates another example of dynamic FTFR by reuse time and frequency for the cell center and cell edge UE groups in an OFDM system in accordance with some embodiments.

FIG. 8B illustrates another example of dynamic FTFR by reuse time and frequency for the cell center and cell edge UE groups in an OFDM system in accordance with some embodiments. In this example, the location of radio resources for the cell edge groups are mutually exclusively for cell edge UE groups of neighboring cells, and the resource allocation are dynamically changing based on the multi-cell optimization results.

Figure 8C:
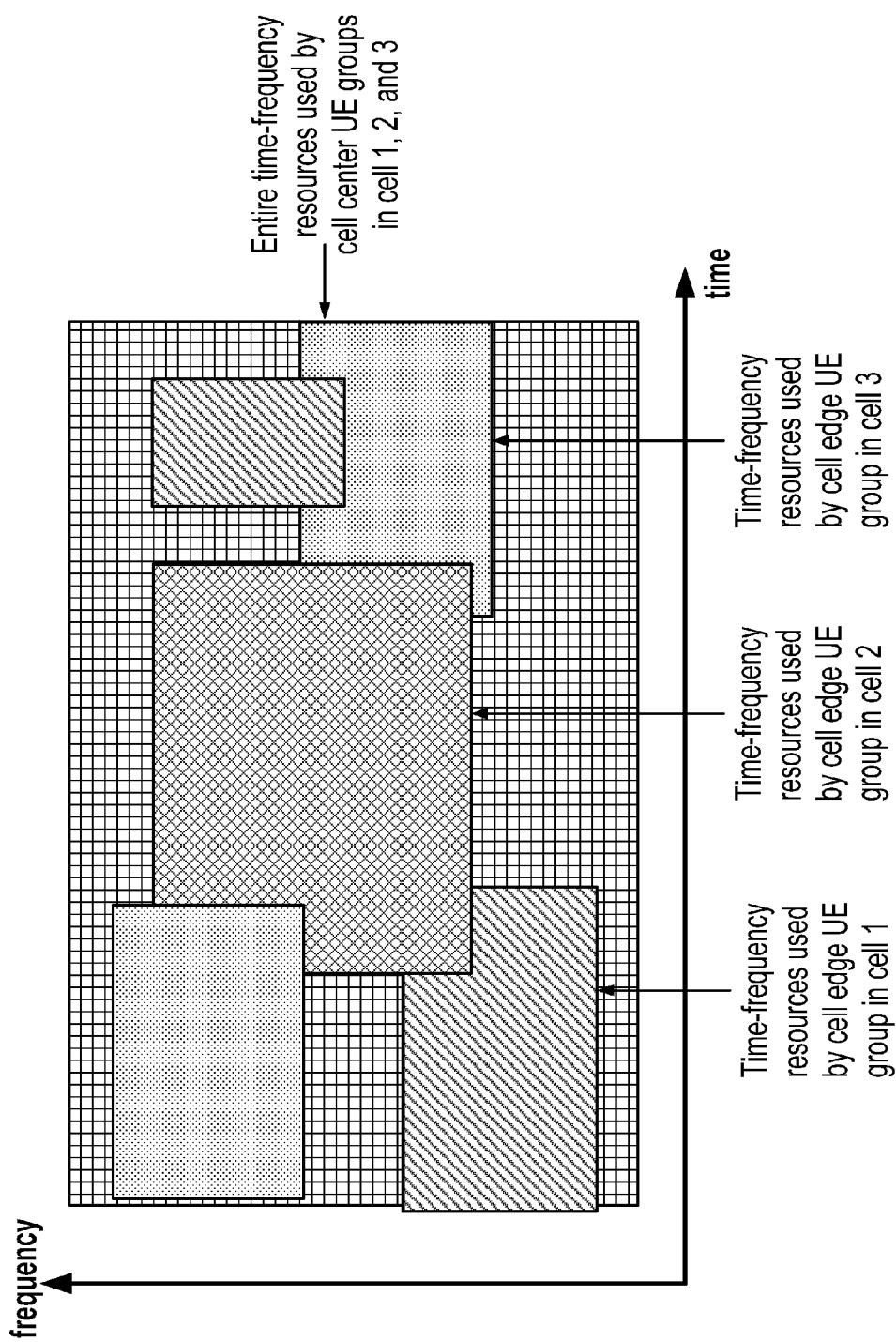
FIG. 8C illustrates another example of dynamic FTFR by reuse time and frequency for the cell center and cell edge UE groups in an OFDM system in accordance with some embodiments.

FIG. 8C illustrates another example of dynamic FTFR by reuse time and frequency for the cell center and cell edge UE groups in an OFDM system in accordance with some embodiments. In this example, the location of radio resources for the cell edge groups are not exclusively for cell edge UE groups of neighboring cells, and the resource allocation are dynamically changing based on the multi-cell optimization results.

In some embodiments, more than one self-optimization cost functions can be used and different cost functions can be applied to different cell groups, different groups of UEs or different individual UEs. For example, the radio resources can also be divided into different groups so that different group of cells or UEs can be assigned to different resource groups. Different resource groups can apply different cost functions.

As an example, consider a use case where a picocell and a macrocell share the same frequency, as shown in FIG. 1$b$. If the main objective between the picocell and macrocell is to minimize the inter-cell interference to the macrocell UEs, UEs in a cell can be grouped into one or more cell edge groups and one or more cell center groups. In this example, there is one cell edge groups for macrocell UEs and one cell edge groups for Picocell 1. The cost function for these two groups of UEs to consider can be maximizing the throughput or data rate of the macrocell edge group UEs while maintaining the minimum services needed for Picocell 1 edge group UEs. For both cell center UE groups in macrocell and Picocell 1, they can use one cost function that maximize the throughput or data rate for both groups. Two examples of how the radio resources are dynamically allocated in the time-frequency plane of an OFDM system is shown in FIG. 11$a$ and FIG. 11$b$, as discussed below.

FIG. 11A illustrates an example of how the radio resources are dynamically allocated in time-frequency plane of an OFDM system with different cost functions for different UE groups in accordance with some embodiments.

Figure 11B:
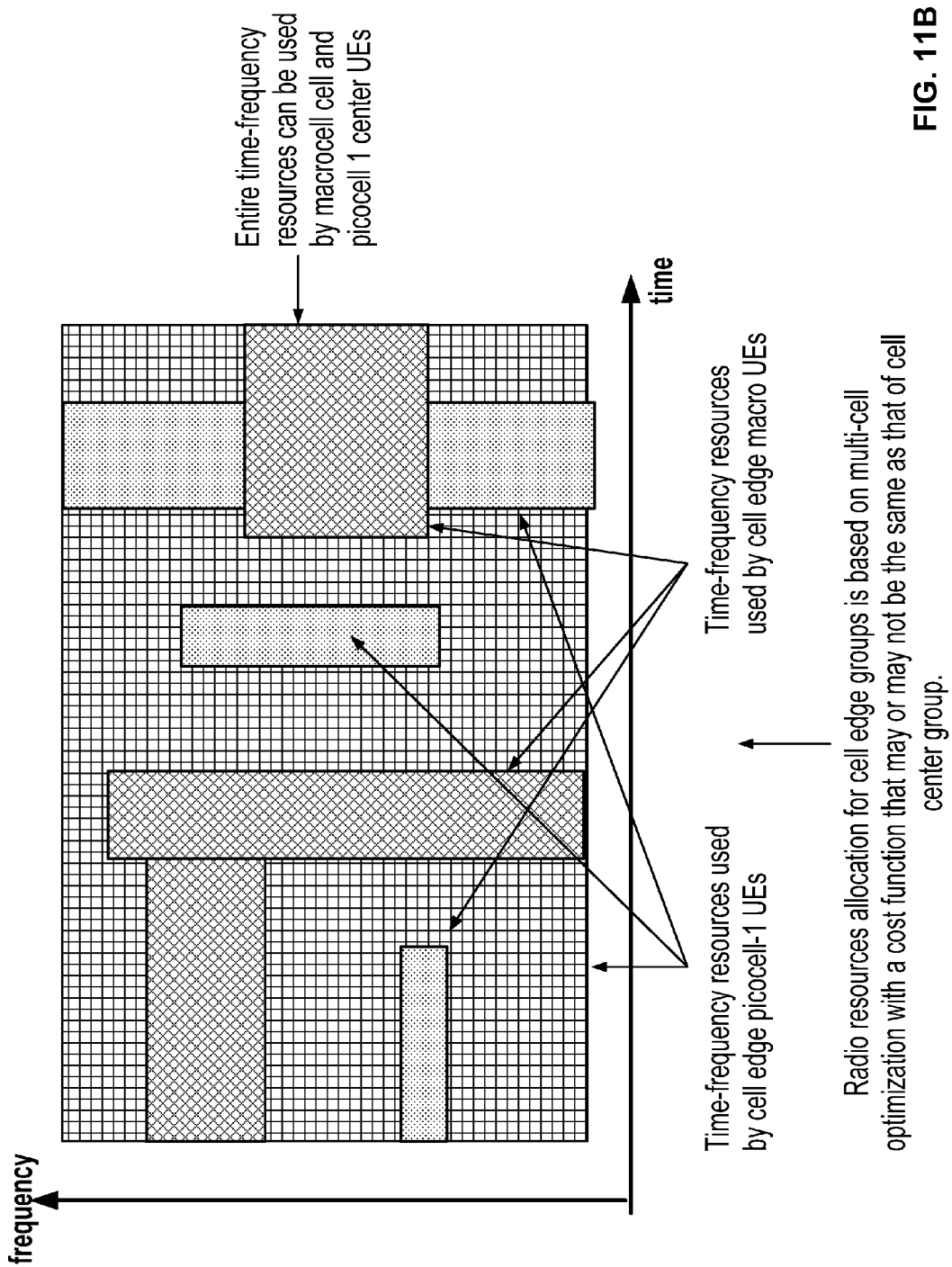
FIG. 11B illustrates an example of how the radio resources are dynamically allocated in time-frequency plane of an OFDM system with different cost functions for different UE groups in accordance with some embodiments.

FIG. 11B illustrates an example of how the radio resources are dynamically allocated in time-frequency plane of an OFDM system with different cost functions for different UE groups in accordance with some embodiments.

In the same example as shown in FIG. 1$b$, another objective can be the optimization among picocells. If the main objective between the picocell 1 and 2 is to maximize the throughput for both cells, the cost function for these two picocells to consider can be maximizing the overall throughput or data rate by coordinating radio resources between the picocells.

As another example, when the objective is to minimize the inter-cell interference to the macrocell UEs while achieving the maximum throughput for all three cells, different cost functions with different priorities and weighting factors should be applied to different groups.

Those of skill will appreciate that the various illustrative logical blocks, modules, and algorithm steps described in connection with the embodiments disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular system and design constraints imposed on the overall system. Skilled persons can implement the described functionality in varying ways for each particular system, but such implementation decisions should not be interpreted as causing a departure from the scope of the invention. In addition, the grouping of functions within a module, block or step is for ease of description. Specific functions or steps can be moved from one module or block without departing from the invention.

The various illustrative logical blocks and modules described in connection with the embodiments disclosed herein can be implemented or performed with a general purpose processor, a digital signal processor (DSP), a text messaging system specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter, which is broadly contemplated by the present invention. It is further understood that the scope of the present invention fully encompasses other embodiments that may become obvious to those skilled in the art.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for autonomous self-optimization in a heterogeneous wireless network, comprising:
a plurality of cells, wherein each cell includes a base station;
a processor of the base station for each cell configured to:
receive one or more targets for self-optimization criteria in the heterogeneous wireless network; and
autonomously adjust a radio resource in the heterogeneous wireless network to achieve the targets for the self-optimization criteria,
wherein two or more of the targets are divided into a first group that are interfered by a first neighbor cell, two or more of the targets are divided into a second group that are not interfered by a second neighbor cell, and the first group and the second group are assigned different priorities; and a memory of the base station for each cell coupled to the processor of the base station for each cell and configured to provide the processor with instructions.

2. The system recited in claim 1, wherein the radio resources comprise one or more of the following: power, time, frequency, and spatial resources.

3. The system recited in claim 1, wherein the radio resources are dynamically adjusted during operation to adjust in real-time parameters selected from one or more of the following: transmit power parameters, fractional time reuse (FTR) parameters, fractional frequency reuse (FFR) parameters, and antenna related parameters.

4. The system recited in claim 1, wherein two or more of the targets are associated with a cell edge group and two or more of the targets are associated with a cell center group based on cell location information, and wherein the cell edge group and the cell center group are each assigned different priorities.

5. A system for multi-cell optimization in a coordinated mode in a heterogeneous wireless network, comprising:
   a plurality of cells, wherein each cell includes a base station or a centralized server connected to the base station for each cell;
   a processor of the base station for each cell or of the centralized server configured to:
      define one or more cost functions for self-optimization criteria in the heterogeneous wireless network; and
      coordinately adjust one or more radio resources of cells or subsets of users in the cells in the heterogeneous wireless network to optimize the cost functions,
      wherein two or more users are divided into a first group that are interfered by a first neighbor cell, two or more users are divided into a second group that are not interfered by a second neighbor cell, and the first group and the second group are assigned different priorities; and
   a memory of the base station for each cell or of the centralized server coupled to the processor of the base station for each cell or of the centralized server and configured to provide the processor with instructions.

6. The system recited in claim 5, wherein the radio resources comprise one or more of the following: power, time, frequency, and spatial resources.

7. The system recited in claim 5, wherein the radio resources are dynamically adjusted during operation to adjust in real-time parameters selected from one or more of the following: transmit power parameters, fractional time reuse (FTR) parameters, fractional frequency reuse (FFR) parameters, and antenna related parameters.

8. A method multi-cell optimization in a coordinated mode in a heterogeneous wireless network including a plurality of cells, wherein each cell includes a base station, the method comprising:
   receiving at each base station one or more targets for self-optimization criteria in the heterogeneous wireless network; and
   autonomously adjusting a radio resource of the base station to achieve the targets for the self-optimization criteria,
   wherein two or more of the targets are divided into a first group that are interfered by a first neighbor cell, two or more of the targets are divided into a second group that are not interfered by a second neighbor cell, and the first group and the second group are assigned different priorities.

9. The method of claim 8, wherein the radio resource comprises one or more of the following: power, time, frequency, and spatial resources.

10. A computer program product for autonomous self-optimization in a heterogeneous wireless network including a plurality of cells, wherein each cell includes a base station, the computer program product being embodied in a tangible non-transitory computer readable storage medium and comprising computer instructions for:
   receiving at each base station one or more targets for self-optimization criteria in the heterogeneous wireless network; and
   autonomously adjusting a radio resource of the base station to achieve the targets for the self-optimization criteria,
   wherein two or more of the targets are divided into a first group that are interfered by a first neighbor cell, two or more of the targets are divided into a second group that are not interfered by a second neighbor cell, and the first group and the second group are assigned different priorities.

11. A method for multi-cell optimization in a coordinated mode in a heterogeneous wireless network including a plurality of cells, wherein each cell includes a base station or a centralized server connected to the base station for each cell, the method comprising:
   defining one or more cost functions for self-optimization criteria in the heterogeneous wireless network; and
   coordinately adjusting one or more radio resources of cells or subsets of users in the cells in the heterogeneous wireless network to optimize the cost functions,
   wherein two or more users are divided into a first group that are interfered by a first neighbor cell, two or more users are divided into a second group that are not interfered by a second neighbor cell, and the first group and the second group are assigned different priorities.

12. A computer program product for multi-cell optimization in a coordinated mode in a heterogeneous wireless network including a plurality of cells, wherein each cell includes a base station or a centralized server connected to the base station for each cell, the computer program product being embodied in a tangible non-transitory computer readable storage medium and comprising computer instructions for:
   defining one or more cost functions for self-optimization criteria in the heterogeneous wireless network; and
   coordinately adjusting one or more radio resources of cells or subsets of users in the cells in the heterogeneous wireless network to optimize the cost functions,
   wherein two or more users are divided into a first group that are interfered by a first neighbor cell, two or more users are divided into a second group that are not interfered by a second neighbor cell, and the first group and the second group are assigned different priorities.

13. The system recited in claim 1, wherein the targets are divided based on interference measurements and a threshold.

14. The system recited in claim 1, wherein one of the one cell and the other cell is a macrocell, and another of the one cell and the other cell is a picocell.

15. The system recited in claim 1, wherein a first target relating to one cell is associated with a first cell group, a second target relating to another cell is associated with a second cell group, the first cell provides a different coverage area size from the other cell, and the first cell group and the second cell group are each assigned different priorities.

* * * * *